United States Patent Office 2,867,584
Patented Jan. 6, 1959

2,867,584

DRILLING FLUID

J. O. Scott, Dallas, Tex., assignor to The Atlantic Refining Company, Philadelphia, Pa., a corporation of Pennsylvania No Drawing. Application January 3, 1955
Serial No. 479,680

7 Claims. (Cl. 252—8.5)

This invention relates to drilling fluids and muds and to a method for drilling with such muds. More particularly, it relates to salt base drilling fluids or muds which are modified by a hydrolyzed polyacrylonitrile and starch so that a high temperature drilling mud is produced.

In the art of drilling wells, especially when rotary drilling methods are used, it has become necessary to provide some means for raising the cuttings to the top of the well and also to prevent water and oil from blowing out of the hole and to prevent seepage of the natural fluids into the well from the porous formations through which the hole is cut. Furthermore, it has been necessary to provide means to prevent cave-ins and solve other borehole difficulties which have been overcome by the use of drilling muds. Therefore, drilling muds have been and are used very extensively. Accordingly, numerous types of drilling muds have been developed by the oil industry, each of these drilling muds having properties which are especially suited for certain types of drilling. Nevertheless, up to the present time there has never been developed a drilling mud which is completely satisfactory at high temperatures in the hot formations which are frequently encountered, especially at great depths. Consequently, it has been difficult to drill into such hot formations and at great depths where the temperatures are so high because the drilling muds will not function properly.

A primary requisite of a high temperature mud is that it remains stable at high temperatures. This means not only must the mud remain fluid and pumpable in a high temperature environment but the filter cake thickness must be controllable and the filter cake strength low. In order to attain this filter cake control and low filter cake strength at high temperatures the mud must be stable in its water-loss properties. Furthermore, high temperature drilling muds should have the properties of inhibiting shale dispersion and shale sloughing from the walls of the borehole, the capacity to contain high clay concentrations, and the resistance to contaminating effects of salt, gypsum, and cement. In addition to having the above properties the drilling mud should also be easy to maintain and have a low conditioning time so that it can be used practically.

An object of this invention is to provide a stable high temperature drilling mud.

Another object of this invention is to provide a high temperature drilling mud which remains fluid and pumpable at high temperatures.

Still another object of this invention is to provide a high temperature drilling mud which is stable in its water-loss properties and is inhibited against shale dispersion and shale sloughing from the walls of the borehole.

A further object of this invention is to provide a high temperature drilling mud which has the capacity to contain high clay concentrations at high temperatures and has resistance to contaminating effects of salt, gypsum, and cement.

The above and other objects of this invention are attained by providing and utilizing a saturated or near-saturated salt water mud which has been modified by starch and by hydrolyzed polyacrylonitrile.

A further object of this invention is to provide a method of drilling deep wells into hot formations without experiencing the detrimental effects produced by the high temperatures in the formation. This and other objects are attained by providing a method of drilling deep wells in hot formations wherein a conventional drilling mud is modified just previous to drilling into such formations by adding thereto in certain proportions salt, starch, and hydrolyzed polyacrylonitrile.

Briefly, this invention is concerned with a high temperature drilling mud which has the properties previously referred to in the objects of the invention. This high temperature drilling mud comprises a salt-saturated drilling mud containing mineral clay to which has been added starch and hydrolyzed polyacrylonitrile both in certain proportions so that a mud is produced which is resistant to contamination, high water-loss, and other detrimental effects which have been experienced by other high temperature drilling muds.

Heretofore, numerous types of muds have been developed for different purposes, a number of which have contained some of the materials included in the drilling mud of this invention. For example, in drilling through salt beds it has been conventional to drill through such beds with a drilling mud containing salt to avoid the formation of solution caverns. In these cases, it was found that the salt flocculated the colloidal clay, therefore, starch was added to offset such flocculation and the resultant high water-loss. Furthermore, hydrolyzed polyacrylonitrile has been used to a limited extent to control the water-loss in fresh water muds. In the method of this invention I have taken advantage of the properties of starch and hydrolyzed polyacrylonitrile when employed separately and in addition have discovered that when starch and hydrolyzed polyacrylonitrile in certain proportions are employed together and added to a saturated salt base clay mud a drilling mud is formed which is an excellent high temperature drilling mud having properties which the starch and the hydrolyzed polyacrylonitrile alone would not produce if added separately to the saturated salt base clay mud in reasonable and economical quantities.

It is well known by the oil industry generally that starch used singly at high temperatures, regardless of the amount used, will in time decompose and will not prevent the high water-loss which is normally experienced at those temperatures. Furthermore, I have found that hydrolyzed polyacrylonitrile, which is generally classified as a water-loss control additive for fresh water clays, could not be used alone for water-loss control in a saturated salt base mud at high temperatures except if extremely high concentrations were added which are not economically feasible. However, I found that for some reason a certain amount of starch and a certain amount of hydrolyzed polyacrylonitrile having a particular molecular weight when mixed in a saturated salt base clay mud would produce a high temperature drilling mud which would reduce water-loss effectively and remain stable at high temperatures. This phenomenon is partly due to the combining of the separate properties of both starch and hydrolyzed polyacrylonitrile. Starch has an initial low water-loss, in other words, it initially builds up a filter cake that has a low permeability, however, after a time at high temperatures this filter cake decomposes and the water-loss of a mud with starch increases readily. On the other hand, mud with practical and economically feasible quantities of hydrolyzed polyacrylonitrile does not have such an initial low water-loss with the result that after a short time the thickness of the filter cake formed becomes seriously detrimental for drilling operations. I have found that when starch and hydrolyzed polyacrylonitrile are both added to the mud the initial and ultimate water-loss control is sufficient for a long enough period of time to prevent seriously detrimental filter cake formation. It is believed that this effect may be due to stabilization caused by the combination.

The hydrolyzed polyacrylonitriles that may be used in this invention are polymers of acrylonitrile

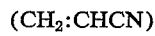

$(CH_2:CHCN)$ which have been hydrolyzed. They must have a molecular weight as determined by the Staudinger method, of at least 50,000. Hydrolyzed polyacrylonitriles having a molecular weight less than 50,000 are of such small particle size that they will pass through the filter cake thus failing to aid in the water-loss control. Hydrolyzed polyacrylonitriles can and are being prepared commercially, under the trade name of "Aeropan," by first polymerizing acrylonitrile to a desired molecular weight of at least 50,000, and thereafter hydrolyzing this polymeric product with sodium hydroxide. It should be understood that this method of preparation is disclosed by way of example only and, in all probability, the hydrolyzed polyacrylonitriles can be prepared by several other methods. Therefore, this invention should not be limited to any such method, particularly since the method of preparing hydrolyzed polyacrylonitrile does not form a part of this invention.

The starch that may be used in this invention is any commercial starch which has heretofore been used for controlling the water-loss of muds. These starches are so well known by the oil industry that a detailed description thereof is not considered necessary.

The water base clay mud of this invention to which the salt, starch and hydrolyzed polyacrylonitrile are added can comprise the so-called fresh water clays, kaolin, montmorillonite, and illite, or the salt water clay attapulgite. In some aspects of this invention, as will be described in more detail hereinafter, it might be desirable to use essentially only so-called fresh water clays such as kaolin, montmorillonite, and illite while in the other aspects attapulgite should be used either essentially exclusively or in combination with other clays. The salt contemplated for use to saturate the water is sodium chloride (NaCl) which is produced commercially for such purposes, however, any sodium chloride salt can be used. It should be realized that substantially all sodium chloride salts frequently contain certain impurities, nevertheless these salts with minor proportions of impurities can be used in this invention without departing from the scope thereof.

Any clay mineral can be used in the drilling mud of this invention, however, various degrees of success will be obtained from the use of each of the clay groups kaolin, montmorillonite, illite, or attapulgite. I have found that the clays from the montmorillonite group produce the best results because a better temperature stability, viscosity and filtrate loss is obtained from the use of the clays from this group. Several disadvantages in the use of the clays of the kaolin, montmorillonite, and illite groups are the low viscosity yield of such clays when added to salt water and their flocculation and gelation when salt is added to fresh water muds containing the clays from these groups. Attapulgite clay, when added to a salt mud, does not have this undesirable property of gelling and has a high viscosity yield but I have found that it is not as stable at high temperatures as the clays from the other groups. At high temperatures the attapulgite clays have a higher filtrate loss than the other clays and therefore the filter cake thickness increases more rapidly. Furthermore, I have discovered that the hydrolyzed polyacrylonitrile is not as effective in stabilizing the starch and the mud if attapulgite clay is employed. Therefore, montmorillonite clays should preferably be used in the drilling mud of this invention and when gelation occurs, the mud is diluted to obtain the requisite fluidity, although the use of attapulgite clays may sometimes be desirable.

The proportions of the various components of the drilling mud of this invention is an important aspect of this invention. In the first place, employing a saturated or near-saturated salt base mud is a pre-requisite of the drilling mud of this invention, in order to provide a clay flocculating environment which will inhibit shale dispersion. As a result, the mud to be saturated, or nearly saturated, must contain salt in an amount at least 20 percent by weight of the salt water solution.

The amount of hydrolyzed polyacrylonitrile to be used in this invention should be in an amount between 1 to 5 pounds per barrel of the entire composition of the drilling mud while 1 to 10 pounds of starch per barrel of drilling mud should be employed. The specific amount of these components, which preferably should always fall within the above limits, depends upon the concentration of the clay, whether the mud has been weighted by additives such as barite, and the water loss reduction desired. These proportions of hydrolyzed polyacrylonitrile and starch are considered necessary in accordance with this invention for the purpose of providing a mud which is highly stable and has a very low water-loss at high temperatures. I have discovered that with the combination of hydrolyzed polyacrylonitrile and starch mixed in a saturated salt-water environment, the hydrolyzed polyacrylonitrile tends to stabilize the starch for some unknown reason so that the starch decomposes less rapidly at high temperatures. As a result the starch and the hydrolyzed polyacrylonitrile eliminate the high water losses which are experienced if the starch or the hydrolyzed polyacrylonitrile is employed separately in feasible and economical quantities in a salt base mud.

In describing the high temperature drilling mud of this invention as comprising a clay mud saturated with salt to which starch and hydrolyzed polyacrylonitrile have been added, it should not be inferred that other additives should not be added to the drilling mud of this invention as treating agents. Several well known agents have been found to give specific beneficial effects. One of these, quebracho, used as a thinner in other muds, will serve, if used in the right proportions, as a water-loss stabilizer in the mud of this invention. Apparently the clay-starch-hydrolyzed polyacrylonitrile combination is more stable and less susceptible to either high temperature flocculation or deterioration when quebracho is present. The need for stabilizing the water loss of the mud depends largely on the temperature level of drilling. In some cases there may be no need for quebracho to aid the hydrolyzed polyacrylonitrile in providing stability although at higher temperature this may be necessary. When there is no adverse effect from adding quebracho addition should be begun immediately following the initial makeup. It is best to add the quebracho slowly through the chemical barrel until the 1 to 3 pound per barrel, usually required for maximum stabilizing effect, is obtained in the mud. The reason for caution in adding quebracho lies in the anomalous behavior the additive has exhibited in salt water muds from different source fresh water clay bases. In some instances quebracho, added in caustic solution, will behave desirably as a thinner but in other cases has the opposite effect of causing viscosity to increase as well as causing increase in water loss. When these adverse effects of quebracho addition occur the increase in viscosity is usually overcome by heat treatment such as is accomplished during a few circulations in a hot hole but the water-loss increase must usually be overcome by starch addition.

Another agent which has been found to be generally extremely useful and frequently necessary for stabilizing the salt mud of this invention is caustic soda (NaOH)

which raises the pH of the system, thus keeping the viscosity at the desired range. I have found that the pH should be maintained between 9 and 10.5, therefore caustic soda in sufficient amounts should be added to the mud to maintain this pH.

Weighting materials may also be added to the mud of this invention for purposes of weighting the mud. Such materials are barite, hematite and plumbite. Oil, diesel or crude, may also be added to the mud to improve drilling rates and hole conditions and may be emulsified in any well known manner.

In the development of treating procedures for the salt water mud it was found that because of the variation in results for a given treatment no standard procedure could be devised for every system. Pilot tests are the best way to determine the applicability of the various treating agents for each different clay system.

Typical high temperature drilling muds of this invention can be prepared by mixing in any mineral clay mud the proportions of salt, hydrolyzed polyacrylonitrile, starch, and treating agents as previously set forth. Following are examples of drilling muds which were prepared for testing purposes.

*Example I*

In a weighted high temperature drilling mud containing clays from the montmorillonite group the proportions of the components were:

|  | Pounds/barrel |
|---|---|
| Montmorillonite clay | 35 |
| Salt | 74 |
| Quebracho | 1 |
| Hydrolyzed polyacrylonitrile | 2.33 |
| Caustic soda | ½ |
| Starch | 5.3 |
| Barite | 360 |

*Example II*

An unweighted drilling mud similar to the mud of Example I had the following composition:

|  | Pounds/barrel |
|---|---|
| Montmorillonite clay | 46 |
| Salt | 96 |
| Quebracho | 1 |
| Hydrolyzed polyacrylonitrile | 2 |
| Caustic soda | ¼ |
| Starch | 5 |

*Example III*

An unweighted attapulgite base drilling mud had the following composition:

|  | Pounds/barrel |
|---|---|
| Attapulgite | 18 |
| Salt | 96 |
| Quebracho | 1 |
| "Aeropan" | 2 |
| Caustic soda | ¼ |
| Starch | 5 |

It should be understood that the above concentrations are expressed in pounds per 42 U. S. gallon barrel of the entire composition of the final mud.

The above examples of the high temperature mud of this invention were all tested for contamination and it was found in each case that salt had not detrimental effect while gypsum, cement, lime, and dispersible shale had very little contamination effect. Upon heating the above muds for the purpose of determining the filtration or water-loss at high temperatures, it was discovered that the muds containing clays from the montmorillonite group (Examples I and II) were slightly superior to the muds containing attapulgite clay. In other words, the starch and hydrolyzed polyacrylonitrile were not as stable in the attapulgite clay muds. Nevertheless, in each case the water-loss tests of the muds showed that the mud cakes formed were relatively thin and weak and did not harden upon prolonged exposure to the high temperature as would be expected with present day mud cakes such as lime base.

To illustrate the water loss or mud filtrate formed by the use of this invention as compared with the properties of a conventional mud comprising only starch or hydrolyzed polyacrylonitrile, the following tables are presented which show the API Water Loss of each mud and the volume of mud filtrate which would be formed by each mud as a function of time. These filtrate volumes were calculated from the water loss and based on each of the muds being exposed to a 250° F. temperature.

| Mud additive | API water loss (75°) | | | API filtrate volume (cc.) at 250° F. | | |
|---|---|---|---|---|---|---|
|  | 0 hr. | 8 hrs. | 23 hrs. | 4 hrs. | 8 hrs. | 20 hrs. |
| 10 lbs./bbl. starch | 4.2 | 79 | 130 | 225 | 440 | 1,070 |
| 5 lbs./bbl. H. P. | 6 | 11 | 16½ | 39 | 66 | 140 |
| 15 lbs./bbl. combination (10 lbs. starch, 5 lbs. H. P.) | 2.3 | 2.6 | 2.0 | 12.5 | 17.7 | 28 |

It should be evident from the above table that the starch mud initially had a lower water loss than the hydrolyzed polyacrylonitrile mud but that at 8 hours the hydrolyzed polyacrylonitrile mud's water loss was less. This is due to the fact that the starch mud at high temperature, regardless of the amount of starch, decomposes after a period of time while, on the other hand, the hydrolyzed polyacrylonitrile mud's initial water loss is high. Assuming that in this specific case the maximum volume of filtrate which can exist for normal drilling operations is 100 cc., it will become apparent that the starch or hydrolyzed polyacrylonitrile used separately in the quantities set forth will not prevent the formation of such volume of filtrate within 20 hours during which it may be necessary to leave the mud in the bottom of the hole without circulation. However, the combination of the starch and hydrolyzed polyacrylonitrile will prevent such formation. It should be realized that quantities of hydrolyzed polyacrylonitrile of more than about five pounds per barrel of mud are not economically feasible. Accordingly, smaller quantities are necessarily employed as is evidenced by Examples I, II, and III.

The method for preparing the drilling mud of this invention may constitute numerous ways. For example, the drilling mud which is formed naturally in a rotary drilling method may be modified by adding salt, hydrolyzed polyacrylonitrile, starch, and treating agents just previous to or immediately after beginning of the drilling. In this case, the drilling mud of this invention would be circulated during substantially the entire drilling operation. Therefore, if any hot formations are encountered, such mud would not be detrimentally affected as would other drilling muds which are presently used.

A preferred method of utilizing the drilling mud of this invention requires that the mud be made or so-called "broken over" from a conventional fresh water mud. In the normal sequence of such breakover operations the hole would be drilled with the fresh water to the point where conversion is desired, which frequently may be the point where protective casing is set, this point being at a location above the hot formation. During the conversion of the fresh water mud to the drilling mud of this invention, it is usually necessary to reject approximately half of the fresh water mud to allow for dilution. This dilution is necessary because the salt, when added to the fresh water mud, will form a gel which has to be diluted in order for the mud to be fluid. Following the dilution of the fresh water mud, salt is then added until the mud is saturated. Although the diluted mud will be very thin the salt addition will increase the gels and viscosity sufficiently to suspend any weighting material, such as barite. After the salt addition the hydrolyzed polyacrylonitrile, starch, and treating agents may be added concurrently.

I have found that when the breakover is performed after casing is set the mud may be broken either in the pits or in the hole. However, when the hole is not cased the mud should be broken over and made up in the pits in sufficient volume to displace the mud in the hole completely, otherwise considerable hole trouble will be encountered when the salt water mixes with the fresh water mud cake.

It should be realized that when attapulgite clay is to be used as the base for the drilling mud of this invention, the attapulgite clay may be added at any time in the operation. As stated previously attapulgite clay has the property of not being affected by the salt as will the so-called fresh water clays which are not attapulgite. In other words, attapulgite clays will not cause changes in gel strength when the salt is added to the mud. Therefore, in some cases it might be very desirable to use attapulgite clays, especially for ease in handling because the mud does not first have to be diluted before the other components, especially salt, are added. In some cases it may be desirable to add attapulgite clay to the so-called fresh water clays which have been modified by the salt, hydrolyzed polyacrylonitrile, and starch. In these cases small quantities of attapulgite are added to provide greater viscosity or gel strength for the mud per unit weight than would be obtained with the fresh water clays.

While this invention has been described in connection with certain preferred embodiments thereof, it should be understood that this description is by way of illustration only and is not intended to limit the invention, the scope of which is defined in the appended claims.

I claim:

1. A water base drilling mud comprising a water base having dispersed therein a mineral clay, salt in an amount at least 20 percent by weight of the solution, 1 to 10 lbs. per bbl. of starch, and 1 to 5 lbs. per bbl. of a hydrolyzed polyacrylonitrile which is polymerized to a molecular weight of at least 50,000.

2. The drilling mud as in claim 1 wherein the mineral clay comprises essentially attapulgite clay.

3. The drilling mud as in claim 1 wherein the mineral clay comprises essentially clays from the montmorillonite group.

4. A water base drilling mud comprising a water base having dispersed therein a mineral clay, salt in an amount of at least 20 percent by weight of the solution, 1 to 10 lbs. per bbl. of starch, 1 to 5 lbs. per bbl. of a hydrolyzed polyacrylonitrile which is polymerized to a molecular weight of at least 50,000 and 1 to 3 lbs. per bbl. of quebracho.

5. A method for drilling a well to deep formations beneath the surface of the earth, the temperatures of said formations being so high that the drilling function of the mud made essentially from mineral clays suspended in water will be detrimentally affected by such temperatures, comprising the steps of drilling into the earth to a depth immediately above said deep formation, while simultaneously circulating in the well a drilling mud made essentially from mineral clays suspended in water, thereafter modifying said drilling mud by incorporating into said drilling mud sodium chloride in an amount at least 20 percent by weight of the solution, 1 to 10 lbs. per bbl. of starch, and 1 to 5 lbs. per bbl. of a hydrolyzed polyacrylonitrile having a molecular weight of at least 50,000 and thereafter drilling into said deep formations while simultaneously circulating said modified drilling mud.

6. The method as in claim 5 wherein the clay suspended in the water comprises essentially attapulgite.

7. A method for drilling a well to deep formations beneath the surface of the earth, the temperatures of said formations being so high that the drilling function of the mud made essentially from a clay suspended in water will be detrimentally affected by such temperatures; comprising the steps of drilling into the earth to a depth immediately above said deep formation, while simultaneously circulating in the well a drilling mud made essentially from the clays of the montmorillonite group suspended in water, thereafter modifying said drilling mud by diluting said drilling mud and adding thereto sodium chloride in an amount at least 20 percent by weight of the solution, 1 to 10 lbs. per bbl. of starch, and 1 to 5 lbs. per bbl. of a hydrolyzed polyacrylonitrile having a molecular weight of at least 50,000 and thereafter drilling into said deep formations while simultaneously circulating said modified drilling mud.

References Cited in the file of this patent
UNITED STATES PATENTS

| | | |
|---|---|---|
| 2,364,434 | Foster | Dec. 5, 1944 |
| 2,399,986 | Chapman | May 7, 1946 |
| 2,552,775 | Fischer et al. | May 15, 1951 |
| 2,718,497 | Oldham et al. | Sept. 20, 1955 |